Patented Nov. 23, 1948

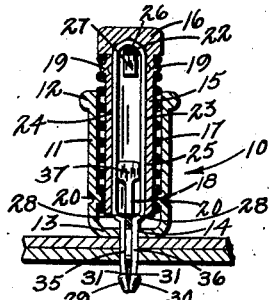

2,454,416

UNITED STATES PATENT OFFICE 2,454,416

FASTENER

Paul Van Sittert, Shaker Heights, Michael Kostrubanic, Jr., Cleveland, and Eugene W. Lehman, East Cleveland, Ohio, assignors to The Cleveland Pneumatic Tool Company, Cleveland, Ohio, a corporation of Ohio Application October 25, 1943, Serial No. 507,494

4 Claims. (Cl. 85—6)

The present invention relates to fasteners for temporarily holding together perforated plates or sheets in superposed relation preparatory to riveting or the like.

Temporary fasteners of the herein described type have become generally known in the trade as sheet holders and are usually applied to and removed from the plates or sheets by means of specially designed pliers. These sheet holders are now being widely used in the aircraft industry with a great deal of success. However, in the prior art devices, there is a tendency for certain of the parts to become broken, causing individual parts of the fastener to spring out of the sheets or pliers and thereby presenting a serious hazard to workers.

It is, therefore, an object of the present invention to provide a temporary fastener, the parts of which are united in a manner to substantially preclude the possibility of injury to workers should the fastener break while in use.

Another object of the invention is to provide a safety type sheet holder including a substantially cylindrical shaped body having a sheet engaging base formed with an opening, a hollow stem movable relative to said body, a one piece retainer anchored within said stem, said retainer having parallel legs slidable through said opening and through the sheets to be clamped, a spreader for said legs formed with means for locking the same to the retainer, and spring means locked to said stem and body for drawing said stem and retainer inwardly of said body.

Other objects and advantages more or less ancillary to the foregoing reside in the specific construction and aggroupment of the elements peculiar to this structure, as will become apparent from a more complete examination of this specification.

In the drawing which illustrates the invention:

Fig. 1 is a vertical sectional view of the improved fastener being inserted in the sheets.

Fig. 2 is a vertical sectional view in a different plane from that of Fig. 1 and illustrating the fastener applied to the sheets.

Fig. 3 is an elevational view of the applied fastener.

Fig. 4 is a vertical sectional view of a fastener constructed for use with sheets having a greater thickness than the sheets for which a conventional fastener is designed.

Fig. 5 is a view similar to Fig. 4 and illustrating the fastener in use with the thicker sheets.

Fig. 6 is a vertical sectional view illustrating a fastener of modified construction being applied to superposed sheets.

Fig. 7 is a vertical sectional view in a different plane and illustrating the fastener applied to the sheets.

Fig. 8 is an elevational view thereof.

Referring to the drawing for a more detailed description thereof, and particularly to the preferred form of the invention as illustrated in Figs. 1 to 3, inclusive, a temporary fastener or sheet holder embodying the features of the present invention is generally designated by the reference numeral 10 and is shown to comprise a substantially cylindrical shaped housing or body 11 formed at its upper end with an external annular flange 12, and having its lower end formed by a cross wall or base 13 having a cylindrical central bore 14 formed therein and extending therethrough.

Mounted for slidable movement within the housing 11 is a hollow, preferably cylindrical shaped sleeve 15, formed at its upper end with an enlarged head 16. The sleeve 15 is movable relative to the housing 11 against the tension of the spring 17 which spring has one end resting against an abutment formed by the lower face of the head 16 and its other end resting on the spreader 18, the construction of which will be hereinafter more fully described. The spring 17 is held in position at its upper end by having the coils thereof engaging diametrically opposed dimpled knobs 19 formed in the sleeve 15, while the lower end of said spring is held by means of the diametrically opposed dimpled knobs 20 formed in the housing 11 adjacent the lower end thereof, as clearly shown in Fig. 1 of the drawing. As is to be understood, the spring 17 is under compression, but it is held against full expansion by reason of its attachment to the sleeve and body through the knobs 19 and 20, respectively.

The portion of the head 16 which communicates with the interior of the sleeve 15 is formed with a recess 21 in which is disposed the loop portion 22 of the retainer 23. The retainer 23 is formed of a single strip of material bent in the shape of a hairpin comprising leg portions 24 and 25 extending in parallel relation within the sleeve 15. Communicating with the recess 21 is a diametrically disposed slot 26 for receiving a removable key 27. In the assembly of the device, after insertion of the retainer 23 within the sleeve 15 and the positioning of the loop portion 22 within the recess 21, the key 27 is extended through the slot 26, thereby locking the loop portion 22 within the recess 21 so that the retainer 23 is held against axial movement independently of the sleeve 15.

The leg members 24 and 25 adjacent the inner end of the sleeve 15 are bent inwardly as indicated at 28 and then extend beyond the tube in parallel relation for a predetermined distance and have formed on the free ends thereof enlarged pointed heads 29 and 30 to provide outwardly inclined lateral projections 31 engageable with the underside of the sheets being clamped, as shown in Fig. 3.

The spreader 18 is in the shape of a cross having an inner portion 32, cross piece 33, and tail piece 34. The cross piece 33 rests upon the inner face of the base 13 being held in position by the lower end of the spring 17, and the tail piece 34 is positioned between the outer ends of the short stems 35 and 36 to hold said stems in spaced relation. The inner portion 32 extends inwardly of the sleeve 15 and is disposed between the legs 24 and 25, the upper end of said portion being provided with a head 37 which is wider than the narrowest portion of the legs 24 and 25. The spreader 18 is held against movement relative to the body 11, and it will be seen that should the sleeve 15 move outwardly relative to the housing 11, such movement would be limited due to contact of the bent portion 28 with the spreader head 37. Thus the retainer is locked within the sleeve, the spring 17 is locked to the sleeve and body, and movement of the retainer and sleeve relative to the spreader is limited through the enlarged head 37.

As is to be understood, the fastener 10 is designed to hold a pair of sheets 38 and 39 in perfect perforate alignment with the enlarged ends 29 and 30 to be inserted through aligned rivet holes 40 provided in the sheets 38 and 39. The fastener 10 is ordinarily applied to and removed from the sheets by means of specially designed pliers, one jaw of the pliers having engagement with the head 16 and the other jaw positioned beneath the annular flange 12 while partially encircling the housing 11. Upon moving the jaws of the pliers toward each other, the sleeve 15 and retainer 23 are projected downwardly which will, of course, move the enlarged ends 29 and 30 beyond the tail piece 34, causing said ends to flex inwardly as they are inserted through the rivet holes as illustrated in Fig. 1. This movement of the sleeve 15 will compress the spring 17, and as soon as the ends 29 and 30 have passed through the holes 40 in the sheets, pressure on the pliers will be released, permitting the spring 17 to urge the sleeve 15 and retainer 23 upwardly. As the enlarged ends 29 and 30 are passed through the aligned holes 40, the base 13 is brought into contact with the upper face of the sheet 38 and, of course, the tail piece 34 will also have passed through said holes. With the housing 11 resting upon the upper face of the sheet, the spring 17 will securely clamp the sheets between the lateral projecting portions 31 and the base 13.

In prior art devices, these fasteners have a tendency to break due to constant usage, faulty materials, or other reasons. This breakage usually occurs on the enlarged ends of the leg portions, or occasionally the spreader will break at the juncture with the cross piece. With the fastener applied to the sheets as illustrated in Figs. 2 and 3, it can be seen that such breakage in the prior art devices would release the several parts of the fastener, permitting the compression spring to extend to its limit with the result that the parts would fly upwardly and outwardly, presenting a serious hazard to the workmen. In accordance with the present invention, the spring is prevented from complete expansion due to its connection with the knobs 19 on the sleeve 15 and the knobs 20 on the housing 11. The retainer is locked within the sleeve through the key 27, and the spreader will prevent movement of the sleeve 15 and retainer 22 out of the housing 11 due to the contact of the enlarged head 37 with the bent area 28 of said retainer. While there is a possibility that the fastener will spring away from the sheets should the stem or spreader break, such movement will be limited since the compression spring is held against complete expansion and, of course, the several parts are prevented from separation due to their interconnection.

The herein described sheet holder has an additional advantage in that it is capable of use with sheets having a greater thickness than has been heretofore possible. The presently constructed sheet holders vary in grip from $\frac{3}{32}''$ to $\frac{5}{16}''$ which means that the largest size is capable of use only with sheets having a combined thickness of $\frac{5}{16}''$. Due to the unitary arrangement of the several parts of the sheet holder of the present invention, it can be used with sheets having a combined thickness of as much as $1\frac{1}{8}''$ but with the same travel as previous fasteners, permitting the use of existing pliers. This usage is shown in Figs. 4 and 5 of the drawings, and it will be observed that the members 35 and 36 of the retainer 23 normally extend through and are held an appreciable distance beyond the base 13 so that it is unnecessary to move the sleeve 15 and retainer 23 an amount greater than the similar parts of the fastener illustrated in Fig. 1 in order to pass the same through the relatively thicker sheets 41 and 42. With the spring 17 locked to the sleeve 15 and housing 11 in the manner previously described, and with the retainer 23 secured within the sleeve by means of the key 27, and with the enlarged head 37 of the spreader 18 resting within the bent portion 28 of the retainer, it will be readily seen that it is possible to simply lengthen the members 35 and 36 in order to adapt the sheet holder for use with sheets having a relatively larger thickness. This feature renders it unnecessary to provide pliers having a longer travel in compressing the spring of the sheet holder, the use of which would tire the hand of the operator because of the reduced mechanical advantage required.

In the prior art devices when the sheet holder was in normal unattached position, the enlarged ends of the retainer legs would be in abutting relation with the outer face of the base of the device, thus necessitating the expenditure of considerable pressure on the retainer against the spring in order to project the legs sufficiently beyond the base of the fastener body to permit the same to pass through the aligned holes of the larger thickness sheets. As before indicated, the same amount of pressure is required to be applied to the head 16 of the fastener illustrated in Figs. 4 and 5 to position the fastener within the holes in the sheets 41 and 42 as would be required to position the smaller size fastener illustrated in Figs. 1 to 3. Thus the fastener constructed in accordance with the present invention embodies features of safety as well as other features making it usable with sheets having a thickness greater than the sheets with which the conventional type of fastener is used.

In the modified form of the invention illustrated in Figs. 6, 7, and 8, there is disclosed a cylindrical shaped housing 45 having a base 46 formed with a central opening 47. As in the preferred form, there is employed a hollow sleeve 48 movable relative to the body 45. However, this form of the invention differs from the preferred form in the means for locking the retainer 49 within the sleeve. Referring to Fig. 7 of the drawing, it will be observed that fingers 50 and 51 are stamped from the body of the sleeve and are bent inwardly for engagement with the loop portion 52 of the retainer 49. The sleeve 48 is preferably formed of a lightweight metal, and the fingers 50 and 51 have a characteristic which permits them to be readily bent into locking engagement with the loop portion 52. In order to facilitate assembly of the device, the sleeve 48 is slotted on opposed sides thereof and across the top wall as indicated at 53 which permits the upper portion of the sleeve to be spread apart for insertion and removal of the retainer 49.

Interposed between the head of the sleeve 48 and the base of the body 45 is a compression spring 54 functioning in the manner previously described. The spreader 55 is identical in construction with the spreader 18 of the preferred form, the upper enlarged end or head 56 thereof preventing separation of the retainer 49 from the body 45. This form of holder is applied to and removed from the sheets in the manner previously described.

By the use of the dimples 19 and 20 we cause the sleeve 15 and the body 11 or 45, as the case may be, to tightly grip or be locked to the spring 17 or 54 near the ends of the latter. By virtue of this construction the spring therefore ties the sleeve and retainer assembly to the body, and if the retainer should be accidentally released, as by the breaking off of the ends 29 and 30, the retainer and sleeve assembly could not then be sprung suddenly out of the housing with a possibility of injuring a workman. The sudden expansion of the spring in such a case might cause the entire device to jump a short distance away from the work, but since there is considerable mass in the housing or body 11 or 45, such movement would be slight.

Another feature of our invention which is independent of the tying of the retainer and sleeve assembly to the body by means of the spring is that illustrated in Figs. 4 and 5 where the head 37 on the spreader is used to limit the retraction of the legs 35 and 36 into the housing, as distinguished from the conventional construction where the movement of the legs into the housing is limited only by the engagement of their enlarged ends with the base of the housing. The present construction is important because it reduces greatly the necessary travel of the retainer, and consequently of the spring and associated parts, where the device is used upon thick work.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

We claim:

1. A device for temporarily clamping together perforated sheets in superposed relation comprising a body having a sheet engaging base provided with an opening, a sleeve movable relative to said body, a retainer locked in said sleeve for movement therewith, said retainer carrying means on one end projecting through said opening and adapted for engagement against the underside of the sheets being clamped, a spreader for said retainer resting on the inner face of said base, said spreader having means engageable with said retainer for limiting upward movement thereof, and a spring having one end resting on said spreader and its other end locked to said sleeve for drawing said sleeve and retainer inwardly of said body to urge said one end of the retainer into sheet clamping engagement.

2. A device for temporarily clamping together perforated sheets in superposed relation comprising a body having a sheet engaging base provided with an opening, a hollow sleeve closed at one end movable relative to said body, a substantially U-shaped retainer within said sleeve, means comprising fingers extending toward the center of said sleeve for clamping said retainer thereto, said retainer including a pair of legs extending beyond said sleeve and through said opening, means on the ends of said legs adapted for engagement against the underside of the sheets being clamped, a spreader for said legs, and spring means drawing said sleeve and retainer inwardly of said body to urge the means on said legs spaced by said spreader into sheet clamping engagement.

3. In a device of the character described, a housing having a sheet engaging base provided with an opening, a retainer having a pair of legs extending through said opening and having feet adapted for engagement with the underside of the sheets to be clamped, a spreader interposed between said legs having a head spaced from the base of the housing, spring means for exerting a force tending to pull said feet toward said base, said spreader being fixed within the housing, and means on said retainer for engaging said head and preventing further retraction of said legs while said feet are spaced from the base of said housing.

4. In a device of the character described, a housing having a sheet engaging base provided with an opening, a retainer having a pair of legs extending through said opening and having feet adapted for engagement with the underside of the sheets to be clamped, a spreader interposed between said legs having a crossarm within the housing resting against the base thereof and having a head spaced from the crossarm, a coil spring within the housing in engagement with said crossarm and operatively connected with said retainer for exerting a force tending to pull said feet toward said base, and means on said retainer for engaging said head and preventing further retraction of said legs while said feet are spaced from the base of said housing.

PAUL VAN SITTERT.
MICHAEL KOSTRUBANIC, Jr.
EUGENE W. LEHMAN.

REFERENCES CITED

The following references are of record in the file of this patent:

UNITED STATES PATENTS

| Number | Name | Date |
| --- | --- | --- |
| 2,256,634 | Webb | Sept. 23, 1941 |
| 2,294,013 | Wallace | Aug. 25, 1942 |
| 2,339,881 | Rossmann | Jan. 25, 1944 |